UNITED STATES PATENT OFFICE.

PHILIP ALEXANDER MACKAY, OF NEW YORK, N. Y.

METHOD OF OBTAINING IRON AND TIN FROM TIN SCRAP.

1,387,443. Specification of Letters Patent. Patented Aug. 9, 1921.

No Drawing. Application filed April 4, 1921. Serial No. 458,468.

*To all whom it may concern:*

Be it known that I, PHILIP ALEXANDER MACKAY, a citizen of the United States, residing at New York city, county of New York, borough of Manhattan, State of New York, have invented certain new and useful Methods of Obtaining Iron and Tin from Tin Scrap, of which the following is a specification.

This invention relates to the recovery of iron and tin from tin scrap.

Tin scrap which may be a portion of the original sheet from which the parts of cans or the like are cut, or may be containers previously used for canning and which have become waste material, is usually treated by electrolytic recovery processes, caustic soda processes, or the well known chlorin recovery process, to separate the tin from the iron, for the dual purpose of recovering tin and clean iron scrap.

The object of the present invention is to provide a simple method of separating the tin and iron to be found in tin scrap, so as to obtain a bright iron.

The invention consists in separating the tin and iron in tin scrap by subjecting the scrap to the action of sulfuric acid containing sulfur trioxid in solution (*i. e.* oleum) until the tin is dissolved.

I have found that if the waste material is well cleaned and dried (for which operations processes are already well known) and is dipped into sulfuric acid containing free $SO_3$ in solution, *i. e.*, a solution known under the name of oleum, and the solution is slightly warm, that the tin is dissolved quickly and the iron recovered not only free from tin, but which remains after drying, in a bright condition; thus in contrast to some other processes in which oxidation takes place very quickly after treatment, thus lowering the commercial value of the iron. In stating that the solution of oleum is warm I do not imply that the bath must be artificially heated before use, but that the operations should be initiated in a place having a warm temperature as hereinafter described.

The present invention may be carried into effect either as a continuous method, or a batch or intermittent system of treatment may be employed, and the following example shows the application of the batch or intermittent system, in which apparatus of the type well known in the tin pickling industry may be employed. A batch of tin scrap is suspended in the oleum solution in a perforated vessel formed of material not attacked by the oleum in the concentrated or diluted condition, and is mechanically moved up and down in the oleum for a period of ten minutes, the oleum solution being at room temperature, or about 20 degrees centigrade. The tin is readily removed in the period of ten minutes, when the iron scrap is lifted from the oleum solution and plunged into a lead lined vessel containing water.

I also propose, as an alternative means of manipulating the batches of scrap (*i. e.* moving them within the liquid), to utilize magnets.

A large proportion of the oxidized tin is carried into the second or wash vessel, where, on dilution with the water, approximately half the tin is precipitated as $SnO_2$, and the other portion remaining in solution is recovered either by precipitation as tin sulfid, or preferably the excess acid is removed by adding iron to the solution to make ferrous sulfate, and the tin is precipitated before all the acid is neutralized by the iron.

The tin left in solution in the oleum after a succession of batches have been treated exists partly in solution, and a portion separates out in suspension in the oleum as $SnO_2.SnSO_4$, and gradually settles to the bottom of the detinning vessel; this may be removed by a cock or valve from time to time and treated for the recovery of the tin.

Successive batches of tin scrap are treated in the manner above described, and as the reactions proceed the tin is removed and the treated batches removed to the water bath; the recovered scrap iron carries with it by capillary attraction a weight of oleum varying from 4 per cent. to 8 per cent. depending on the gage of the scrap treated.

As some of this oleum (usually an amount varying from 4 per cent. to 8 per cent. of the weight of scrap) is removed from the oleum vat with each batch of scrap removed therefrom, the level is made up by addition of fresh oleum, and I find in practice that I can maintain the oleum at a strength of so-called 10 per cent. oleum, this containing 10 per cent. free $SO_3$ which strength may be readily maintained by making up this loss by addition of oleum of 20 per cent. strength.

At the same time I maintain equilibrium of temperature of the bath within narrow limits, say, between 45 degrees and 55 degrees centigrade.

During the period of ten minutes treatment of the first batch of scrap tin by the oleum the temperature of the oleum solution rises slightly from the exothermic reaction of the oleum acting upon the tin. As each succeeding batch is treated the temperature continues to rise until it reaches approximately 50 degrees centigrade, and as the temperature rises, the time necessary for the removal of the tin is shortened until at the temperature of 50 degrees centigrade it is possible to remove the tin in three minutes on grades of scrap containing about 2 per cent. of tin. Should the temperature rise beyond 55° C., the bath may be cooled by a cold water coil or jacket. This, however, is not usually necessary, the loss of heat by radiation and conduction being sufficient to prevent rise of temperature above the stated degree. Hence the temperature control may be regarded as more or less automatic. The following chemical reaction is involved as the base reaction:

$$Sn + 2SO_3 = SnO_2 + 2SO_2.$$

It is to be noted that no extraneous heating of the oleum solution is necessary as the required temperatures above the temperature of the process chamber are wholly obtained by the exothermic reaction which occurs.

Although I have mentioned in this specification that the iron scrap is previously cleaned and dried, this is not an essential to the process, but merely as an economy to save oleum and also to maintain the detinning vessel as clean as possible.

What I claim as new and useful, and of my own invention, and desire to secure by Letters Patent, is:—

1. A method of separating the tin and iron in tin scrap in which the scrap is subjected to the action of sulfuric acid containing free sulfur trioxid in solution, until the major part at least, of the tin is dissolved.

2. A method of separating the tin and iron in tin scrap in which the scrap is subjected to the action of sulfuric acid, containing free sulfur trioxid in solution by successively dipping the scrap in the acid for short periods, and subsequently washing the residual iron in water.

3. A method of separating the tin and iron in tin scrap in which the scrap is subjected to the action of sulfuric acid containing free sulfur trioxid in solution, until the tin is dissolved, and maintaining a substantially constant temperature of the acid bath during the treatment of successive quantities of scrap.

4. In the process of claim 2, the step of maintaining the temperature of the bath of sulfur trioxid in sulfuric acid about constant at between 45° C., and 55° C., and maintaining said solution at about a uniform concentration throughout the operation.

5. In the method of separating the tin and iron in tin scrap in which the scrap is subjected to the action of sulfuric acid containing free sulfur trioxid in solution, until the tin is dissolved, the improvement which comprises conducting such operation at a temperature above ordinary room temperature, such temperature being wholly obtained and maintained by exothermic chemical reaction.

6. In the method of separating the tin and iron in tin scrap in which the scrap is subjected to the action of sulfuric acid containing free sulfur trioxid in solution, until the tin is dissolved, the improvement which comprises conducting such operation at a temperature above ordinary room temperature, such temperature being wholly obtained and maintained by exothermic chemical reaction, and maintaining a constant concentration of acid throughout the operation.

7. A method of separating the tin and iron in tin scrap in which the scrap is subjected to the action of sulfuric acid, containing free sulfur trioxid in solution by successively dipping the scrap in the acid for short periods and subsequently washing the separated iron in water, the said treatment being conducted at a temperature of between about 45° C., and 55° C., during the treatment of successive quantities of scrap, and maintaining a constant concentration of the said acid during the treatment of successive batches of such tin scrap therein.

8. A method of separating the tin and iron in tin scrap which comprises subjecting the scrap to the action of sulfuric acid containing free sulfur trioxid in solution by successively dipping the scrap in the acid for short periods, and subsequently washing the separated iron in water, and recovering the oxidized tin from the acid solution and the water as set forth.

In testimony whereof I affix my signature.

PHILIP ALEXANDER MACKAY.